Feb. 2, 1937.  G. P. PIGANEAU  2,069,680
BRAKE
Filed April 5, 1935  2 Sheets-Sheet 1
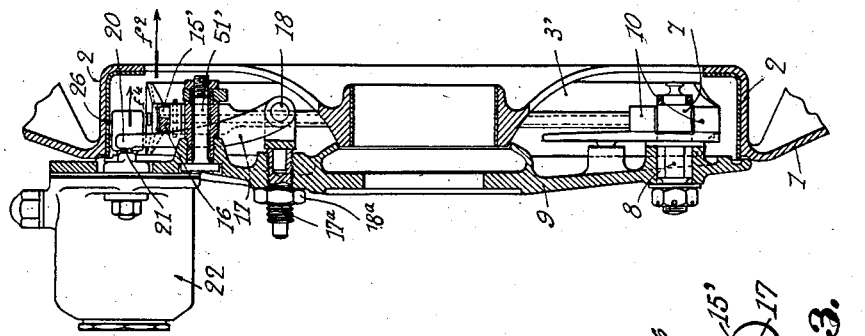
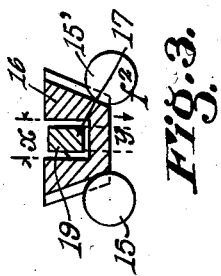
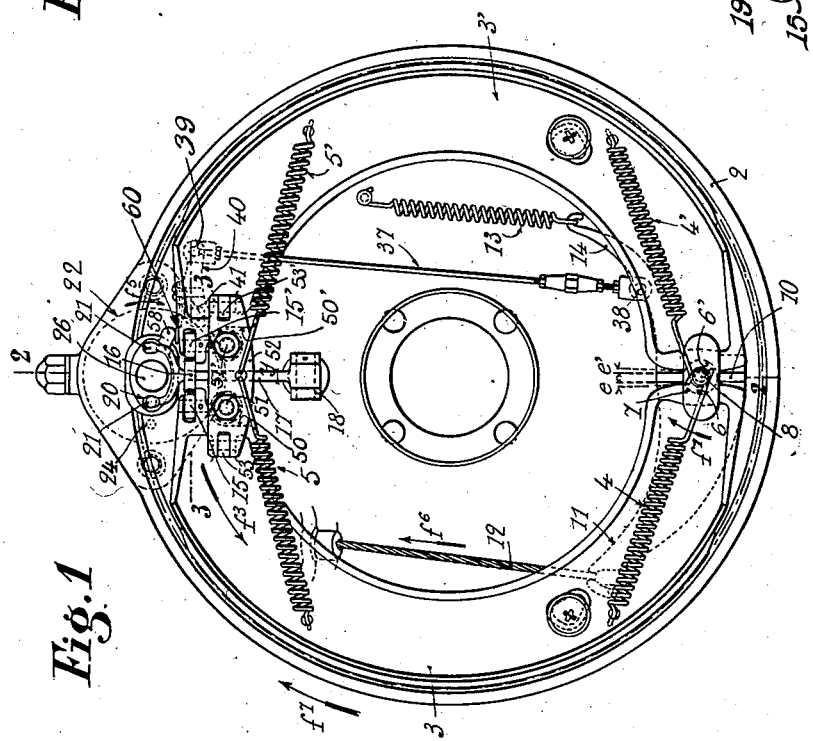

Feb. 2, 1937.   G. P. PIGANEAU   2,069,680
BRAKE
Filed April 5, 1935   2 Sheets-Sheet 2

G. P. Piganeau
INVENTOR
By Glascock Downing & Seebold
Attys.

Patented Feb. 2, 1937

2,069,680

UNITED STATES PATENT OFFICE 2,069,680

BRAKE

Gérard Pierre Piganeau, Paris, France

Application April 5, 1935, Serial No. 14,936
In France April 19, 1934

7 Claims. (Cl. 188—140)

The present invention has for its object an improved brake for land vehicles, for the landing gear of aircraft, and for other uses.

The said brake, which permits of avoiding the skidding of the wheels, is chiefly distinguished by the fact that it is so arranged that it may be operated, at will, according to the speed of the part which is to be braked, and according to the adjustment adopted, either automatically by a servo-motor, or directly in a non-automatic manner by the use of a pedal or like operating device, or by these two means at the same time.

The mechanism is so arranged that the servo-motor will be coupled as soon as the pedal or like operating device used for direct braking is acted upon.

Preferably, a certain play is allowed in the connection between the braking device or devices (shoes, cheeks or the like) and the device or devices used for direct operating, in such manner that the coupling of the servo-motor will precede all direct action of the operating device or devices upon the said braking device or devices.

Preferably, the servo-motor is of the centrifugal and self-regulating type.

Due to this self-regulating, one may adjust the brake in two different ways, while avoiding, in both cases, all improper skidding of the wheel.

(a) The travel of the push-piece or equivalent part of the servo-motor is such that it will ensure, in itself, the complete application of the braking device or devices; in this case, the direct and non-automatic control is not employed. The difference in the effort required for the braking, automatically or by direct action, is sufficiently great to clearly distinguish these two methods of use.

All skidding of the wheel is thus avoided, when the latter is braked at high speed, as all improper action for direct braking is rendered difficult. This is particularly important when the braking is effected upon slippery ground; it is even quite indispensable in order to ensure the proper braking of aircraft when landing. (Moreover, in this latter case, the direct control of the brake can be entirely eliminated, as the use of the servo-motor by itself requires but a very slight effort, and causes no trouble to the pilot.)

(b) The travel of the push-piece or equivalent part of the servo-motor is limited; in this case, the action of the servo-motor is limited, for example, to a simple approaching stroke for the brake-cheeks, and the pressure of such cheeks will then be ensured solely by the cam of the non-automatic control; in this event the effect of friction drag is used for the braking. For this adjustment, the principal travel of the braking parts is ensured by the servo-motor, and thus the travel to be obtained by the direct control is reduced, and there is available, for this purpose, the whole travel of the operating device, except for the small preliminary travel required for the coupling of the servo-motor.

It should be noted that even in the case in which the travel of the push-piece, or equivalent part, of the servo-motor is limited, this preliminary travel will be sufficient to prevent all skidding of the braked wheel, for as soon as the speed of the wheel falls below a given safe value, the push-piece of the servo-motor returns towards its inoperative position and the cheeks or equivalent parts are also brought back towards their inoperative position by their return springs.

The return springs of the brake will then set up to the direct control a resistance which is less than the resistance produced during the operation of the servo-motor, whereby it will be possible to distinguish very readily the direct control from the automatic control.

At slow speeds, which are not sufficient to operate the servo-motor, the braking is ensured by the direct control of the braking parts.

According to another characteristic, the device for the non-automatic control, and the servo-motor, are located relatively to the part or parts to be controlled (shoes or cheeks) in such way that these parts will bear, directly or not, upon one of these devices (or upon a stop which is mounted adjacent the direct control) when they are subjected to the action of either of these devices, and inversely.

In the case of a brake comprising a drum and cheeks (or shoes), each cheek will bear at one end upon a loose actuator actuated by the servo-motor, and at its other end, in the idle position, upon a cylindrical support, the axis of which coincides with that of the other actuator which is controlled by the operating device, a slight play being provided, in the idle position, between this actuator and the cheek, so as to allow an inoperative forward travel which is used to advantage to couple the servo-motor.

In the accompanying drawings, which are given solely by way of example:

Fig. 1 is a front view of a brake improved in conformity with the invention.

Fig. 2 is a diametrical section of the same on the line 2—2 of Fig. 1.

Fig. 3 is a partial section on the line 3—3 of Fig. 1.

Figure 4:
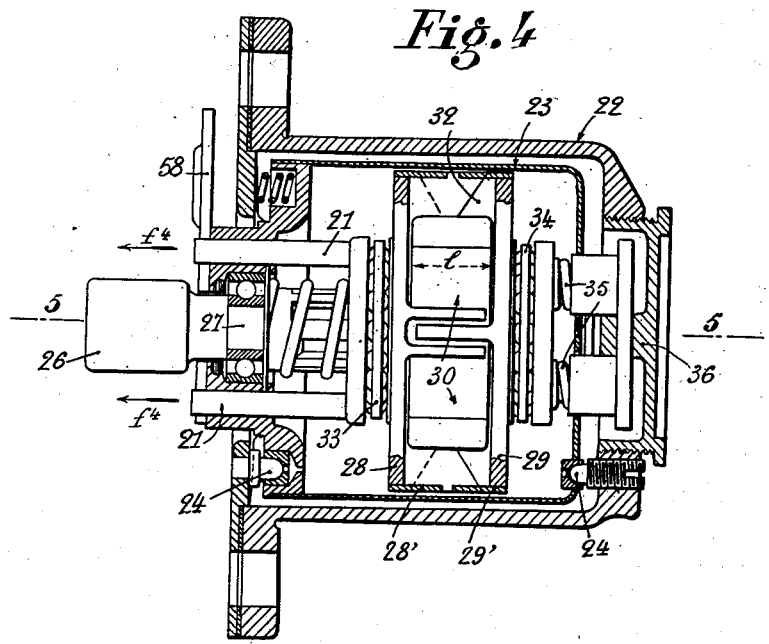
Fig. 4 is a vertical section, on the line 4—4 of Fig. 5 of a servo-motor of the centrifugal type, adapted for this use.

In the embodiment herein represented, the brake is adapted for the braking of a wheel 1 (Fig. 2) which is provided with a brake drum 2. The said rotatable brake drum 2 is subject to the friction of two brake cheeks 3 and 3', which the springs 4—4', 5—5' tend to separate from the said drum 2.

Under the action of the springs 4—4', the cheeks 3 and 3' rest, in the idle position, by means of concave cylindrical stops or supports 6 and 6' (Fig. 1), against a cylindrical support 7. A journal 8, having the same axis as the support 7, is mounted on the support 7 and is secured to the brake disc 9. This journal 8 guides, adjacent a part of the corresponding ends of the cheeks 3—3', a flat cam 10, the thickness of which is such that the clearances $e$ and $e'$ are provided between its faces and the corresponding surfaces of the jaws 3 and 3'. The cam 10 may be set in rotation, in the direction of the arrow $f^1$ (Fig. 1) by the use of any suitable control, from a distance, for instance by a lever 11 secured to the journal 8, and by a cable 12 attached to a pedal or braking lever which has a determined total travel. In the usual devices which resemble the one herein described, a certain part of this travel $l$ is used in order to take up the play at $e$—$e'$ between the cam 10 and the cheeks 3—3', which is thus entirely lost to the detriment of the useful stroke.

The movement of oscillation of the cam 10, secured to the lever 11, in the direction contrary to the arrow $f^1$, is assured by a spring 13 (Fig. 1) acting upon an extension 14 of the said lever 11.

The opposite ends of the cheeks 3 and 3' are urged by the springs 5 and 5', through the medium of the rollers 15 and 15' (Figs. 1 and 3), against the lateral faces of an actuator 16 having the form of a wedge. Preferably, the rollers 15—15' are inserted into the actuator 16, owing to convex and concave surfaces, so as to allow the cheeks 3 and 3' to pivot about the actuator 16. The actuator 16 is driven in the direction of the arrow $f^2$ (Figs. 2 and 3), which tends to separate the cheeks 3 and 3' by means of a lever 17. This lever 17 is pivotally mounted on a spindle 18 which is preferably adjustable in position, by means of a bolt 17$^a$ and a securing nut 18$^a$, in such manner as to allow of taking up the play due to the wear. The lever 17 is engaged in a recess 19 (Fig. 3) in the wedge 16. The recess 19 has a width $x$ (Fig. 3) which is greater than the width $y$ of the lever 17, and thus the wedge 16 is free to float and to be displaced in two opposite tangential directions from the mean inoperative position shown in Fig. 1 on a distance depending from said widths $x$ and $y$ and equal to $$\frac{x-y}{2}$$

The device consisting of the cheeks 3 and 3' and the wedge 16 can thus be moved in the direction of the arrow $f^3$ (Fig. 1), or in the contrary direction, independently of the lever 17, starting from the mean position, shown in Fig. 1, on said distance equal to $$\frac{x-y}{2}$$

said distance being so chosen as to be greater than the clearance existing, in the idle position, between either of the cheeks 3—3' and the inner surface of the drum 2.

The upper end of the lever 17 forms a fork 20, which is acted upon, in the direction of the arrow $f^4$ (Figs. 2 and 4), by two push-pieces 21 of a servo-motor operating by centrifugal force.

Figure 5:
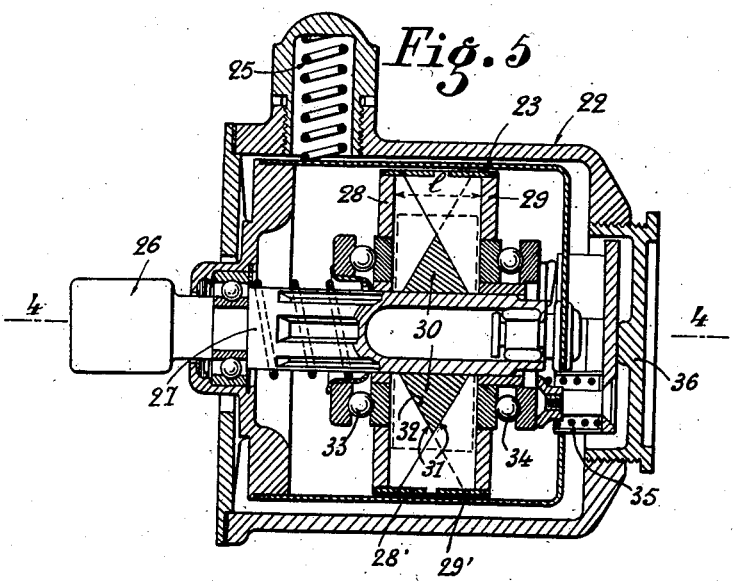
Fig. 5 is a horizontal section on the line 5—5 of Fig. 4.

This servo-motor is for instance of a known type, comprising a casing 22 rigidly secured to the brake disc 9. This casing 22 contains a cylinder 23 (Figs. 4 and 5) which is pivotally mounted, in the casing 22, upon journals 24 (Fig. 1), which are parallel with the longitudinal axis of the casing 22, but are eccentric with reference to this axis.

The cylinder 23 is subjected to the action of a thrust spring 25 which tends to turn it about the journals 24 in the direction of the arrow $f^5$ (Fig. 1), and thus a roller 26 mounted on a shaft 27 which is rotatable in this cylinder 23, is held apart (Fig. 2) from the drum 2 of the brake.

At the outside of the casing 22, the cylinder 23 is provided with an arm 58 (Figs. 1 and 4), and hence when it is acted upon in the direction contrary to the arrow $f^5$ (Fig. 1), this will cause a displacement of the cylinder 23 in the casing 22 and will bring the roller 26 into contact with the rotatable drum 2, thus rotating the spindle 27. This rotation increases the distance $l$ between the two discs 28 and 29 (Figs. 4 and 5) which are slidably keyed to said shaft 27, and between which are mounted the heavy pieces 30, having inclined parts 31 co-operating with the corresponding inclined parts of projections 32 pertaining to the discs 28—29. These heavy pieces 30, which are rotated by the projections 32, are subjected to the action of centrifugal force which tends to separate them from the axis. The disc 28 acts, through the medium of a thrust bearing 33, upon the push-pieces 21. The disc 29 rests, through the medium of a thrust bearing 34 and of springs 35, upon a plug 36 which is screwed into the casing 22 and is thus adjustable in position.

This device is such that the increase in the length $l$ is limited to a value $l'$ by the contact between the pieces 30 and the inner faces of the cylindrical bearing parts 28' and 29', secured to the periphery of the discs 28 and 29.

The increase $l'$ of the length $l$ is manifested as a displacement $l^1$ of the disc 28, and by a displacement $l^2$ of the disc 29. The displacement $l^2$ of the disc 29 will depend, for a given resistance set up against the push-pieces 21, upon the position which is given to the plug 36, as the compression for the balancing of the springs 35 depends upon this position of the plug 36. Hence, for a force of resistance against the push-pieces 21, (which force depends upon the springs 5—5'), it is possible to regulate at will the stroke $l^1$ of the push-pieces 21 by means of the plug 36.

The mechanism is completed by a connection between the lever operating the cam 10, and the lever 58 for the clutch engagement of the servo-motor, and this connection permits the clutching of this servo-motor when acting upon the lever 11 controlling the cam 10. In the example herein represented, the connection consists of a rod 37 (Fig. 1) which is pivoted at 38 to an extension 14 of the lever 11, and at 39 to a lever 40 pivoting at 41, the other end of which, consisting of an elastic strip 60 (or of several superposed elastic strips), bears in the contrary direction to the arrow $f^5$, upon the lever 58. The ratio of the power transmission is such that a movement of the lever 11, which is less than that which is necessary to permit the cam 10 to take up the play e e' and to make contact with the ends of the cheeks 3 and 3', will suffice in order that the lever 58, by means of the transmission gear 11—14—37—40, shall ensure the clutching of the servo-motor.

The cheeks 3 and 3' are separated at their upper ends, at 50 and 50', from the spindles 51 and 51' securing the plate 52 carrying the usual rollers 53—53' for guiding the cheeks.

The operation is as follows: when, by means of the operating pedal or lever, one draws upon the cable 12 in the direction of the arrow $f^6$ (Fig. 1), the lever 11 turns in the direction of the arrow $f^1$, and this, as above stated, causes the clutching of the servo-motor before the cam 10 has entirely taken up the clearance e e'. The roller 26 is then set in rotation, and the pieces 30 move apart by the action of centrifugal force, thus causing a displacement $l^1$ of the push-pieces 21 in the direction of the arrow $f^4$ (Fig. 4), that is, a turning of the lever 17, and a certain displacement $m$, in the direction of the arrow $f^2$, of the wedge 16. The maximum displacement $m$ will thus depend, finally, upon the position of the plug 36 and of the stop rings 28' and 29' of the discs 28 and 29.

Under the action of the wedge 16, the cheeks 3 and 3' will move apart while pivoting, at their portions 6 and 6', on the part 7 of the spindle 8.

If the movement $m$ of the wedge 16 is sufficient, the cheeks 3—3' will be strongly applied, by means of their friction facings, against the inner surface of the drum 2, thus causing an energetic braking of this drum. The vehicle, provided with the wheel carrying the braking device above mentioned, will slow up. The action of the centrifugal force upon the heavy pieces 30 will decrease with the speed of the wheel.

As long as this force is considerable, the cheeks 3—3' will be held by the wedge 16 against the drum 2, while resting against their stationary support 7, and this will offer a certain resistance to any displacement of the cam 10 used for direct control, thus preventing all improper action upon this cam. During the whole of this period of operation of the servo-motor, the braking will be thus assured exclusively by the servo-motor, and there will be no risk of directly causing an improper braking which would skid the wheel.

As above stated, according as the wheel slows up, the action of the heavy pieces 30 will diminish, and the pressure of the cheeks 3—3' upon the spindle 8 will also diminish. When the speed of the wheel has sufficiently diminished to render the action of the heavy pieces 30 insufficient, the pressure upon the support 7 decreases, and one may continue the braking by the rotation of the cam 10 and the lever 11 under the action of the cable 12. Thus the cam 10 will turn in the direction of the arrow $f^1$ if one continues to act upon the operating pedal, which, at this time, is "felt" to become gradually free under the foot. The cam 10 then separates the cheeks 3—3' from the fixed point 7, against the action of the springs 4—4', and it thus permits of directly continuing the braking action which the servo-motor has assured at the time when this braking was the most necessary. From this time onward, the wheel can of course be skidded, but this skidding cannot have any serious consequences, as the vehicle has now considerably slowed up.

If the stroke $m$ of the wedge-shaped cam is insufficient to hold the cheeks 3—3' upon the drum 2, but is however sufficient to ensure their friction upon said drum, the cheeks 3—3', when once in contact with the drum 2, are drawn forward, by friction, by the said drum 2 (the well-known effect of brake friction drag). The device consisting of the cheek 3, the wedge 16 and the cheek 3' will move, relatively to the lever 17, by the whole value of the clearance $$\frac{x-y}{2}$$

between the lever 17 and the recess 19, in the direction of rotation of the drum 2, for instance in the contrary direction to the arrow $f^3$ (if the drum rotates in the direction of the arrow $f^7$).

Owing to the movement of the whole device due to the friction, the cheek 3' which bears against the cam 10 will be strongly pressed against the drum 2. As to the cheek 3, this is held, by the effect of brake drag, against the drum 2.

The servo-motor has thus applied the two cheeks against the brake drum; it will suffice, in order to obtain the braking, to act at this time upon the cam 10 which is under direct control.

All skidding of the wheel is impossible, for if the speed of the wheel should fall below the minimum necessary for the action of the heavy pieces 30, the wedge 16 will no longer be maintained, and it will recede from the cheeks 3—3' which are drawn back by the springs 5—5'.

In the second method of use as above described, the servo-motor thus permits, in fact, of approaching automatically the cheeks against the brake drum, said approaching movement being obtained in the usual braking mechanisms by means of the pedal or the operating lever, that is, to the detriment of the effective braking movement of this device. On the contrary, due to the servo-motor, the whole travel of the said operating device is available for the effective work of braking, except for the slight travel necessary to couple the servo-motor, which in this case acts as a means for taking up the play, such as is required by the construction or is due to the wear. The braking mechanism thus has a great responsiveness, as the cheeks are brought automatically against the brake drum at the beginning of the effective action of the direct operating device.

In all cases, if the braking is done only at slow speeds, which are insufficient to bring in the action of the servo-motor, the cam 10 will separate the cheeks 3 and 3'.

Obviously, the invention is not limited to the embodiment herein represented and described, which are given solely by way of example.

Having now described my invention what I claim as new and desire to secure by Letters Patent is:

1. In combination, a rotary member adapted to be rotated at different speeds, braking means adapted to be brought into and out of engagement with said rotary member, control means adapted to be operated by said rotary member and to bring said braking means into engagement with said rotary member when the speed of said rotary member exceeds a predetermined value, clutching means adapted to connect operatively said control means and said rotary member, a control member adapted also to bring said braking means into engagement with said rotary member, and operating means adapted to be moved on a two-part stroke and to bring said clutching means into operative position during the first part of said stroke, whereby said braking means are brought into engagement with said rotary member when said rotary member rotates at a speed exceeding said predetermined value, and to bring the control member into its operative position during the second part of said stroke, whereby said braking means are brought into engagement with said rotary member when said rotary member rotates at a speed lower than said predetermined value and are pressed against said rotary member for all speeds of said rotary member.

2. In a combination according to claim 1, the further feature consisting in that said control member adapted to cooperate with said operating means and with said braking means is in the inoperative position at a sufficient distance from one of said two means to allow said operating means to bring said clutching means into operative position before bringing said control member into engagement with said braking means.

3. In combination, a rotary member, braking means adapted to be brought into and out of engagement with said rotary member, control means adapted to be operated by said rotary member and to act upon one end of said braking means so as to bring said braking means into engagement with said rotary member, clutching means adapted to connect operatively said control means and said rotary member, a control member adapted to act upon the other end of said braking means so as to bring said braking means into engagement with said rotary member, and operating means adapted to be moved on a two-part stroke and to bring said clutching means into operative position during the first part of said stroke, whereby said braking means are applied against said rotary member and are pressed against said control member so as to oppose the movement of said control member, and to bring the control member into its operative position during the second part of said stroke.

4. In combination, a rotary member, a fixed stop member near the periphery of said rotary member, two braking cheeks adapted to be brought into and out of engagement with said rotary member and adapted each to bear by one of its ends on said fixed stop member, a control member disposed between said ends of said braking cheeks and so shaped as to be at a distance from said ends in the inoperative position and to bear on said ends in the operative position and to be adapted in this latter position to cause the engagement of said braking cheeks with said rotary member, an expanding member disposed floatingly between the two other ends of said braking cheeks and adapted also to bring said braking cheeks into engagement with said rotary member, control means adapted to be operated by said rotary member and engaging slidingly said expanding member so as to be adapted to exert on said expanding member an effort in a direction parallel to the axis of the rotary member and to allow said expanding member to move in a circumferential direction with said braking cheeks, clutching means adapted to connect operatively said control means and said rotary member, and operating means adapted to be moved on a two-part stroke and to bring said clutching means into operative position during the first part of said stroke, and to bring said control member into its operative position during the second part of said stroke.

5. In combination, a rotary member, braking means adapted to be brought into and out of engagement with said rotary member, a control member adapted to bring said braking means into engagement with said rotary member, an expanding member also adapted to bring said braking means into engagement with said rotary member, a rotatable shaft, clutching means between said rotatable shaft and said rotary member, a sliding member adapted to slide along said shaft, extensible and retractible centrifugal means adapted to be rotated by said shaft and operatively connected with said sliding member, whereby said sliding member is adapted to be moved along said shaft, transmission means between said sliding member and said expanding member, and operating means adapted to be moved on a two-part stroke and to bring said clutching means into operative position during the first part of said stroke, and to bring said control member into its operative position during the second part of said stroke.

6. In a combination according to claim 5 the further feature consisting in stop means adapted to limit the movement of said extensible and retractible centrifugal means along said shaft.

7. In combination, a rotary member, braking means adapted to be brought into and out of engagement with said rotary member, a control member adapted to bring said braking means into engagement with said rotary member, an expanding member also adapted to bring said braking means into engagement with said rotary member, a rotatable shaft, clutching means between said rotatable shaft and said rotary member, a sliding member adapted to slide along said shaft, extensible and retractible centrifugal means adapted to be rotated by said shaft and operatively connected with said sliding member, whereby said sliding member is adapted to be moved along said shaft, a fixed pivot, adjusting means adapted to vary the position of said pivot, a lever pivoted on said pivot and adapted to be acted upon by said sliding member and to move said expanding member, and operating means adapted to be moved on a two-part stroke and to bring said clutching means into operative position during the first part of said stroke, and to bring said control member into its operative position during the second part of said stroke.

GÉRARD PIERRE PIGANEAU.